(No Model.)  A. W. TAYLOR.  2 Sheets—Sheet 1.

CORN HARVESTER.

No. 274,843.  Patented Mar. 27, 1883.

WITNESSES
Franck L. Ourand,
Tr. E. Oliphant,

INVENTOR
Andrew W. Taylor,
per Chas. H. Fowler
Attorney (No Model.) 2 Sheets—Sheet 2.
A. W. TAYLOR.
CORN HARVESTER.
No. 274,843. Patented Mar. 27, 1883.
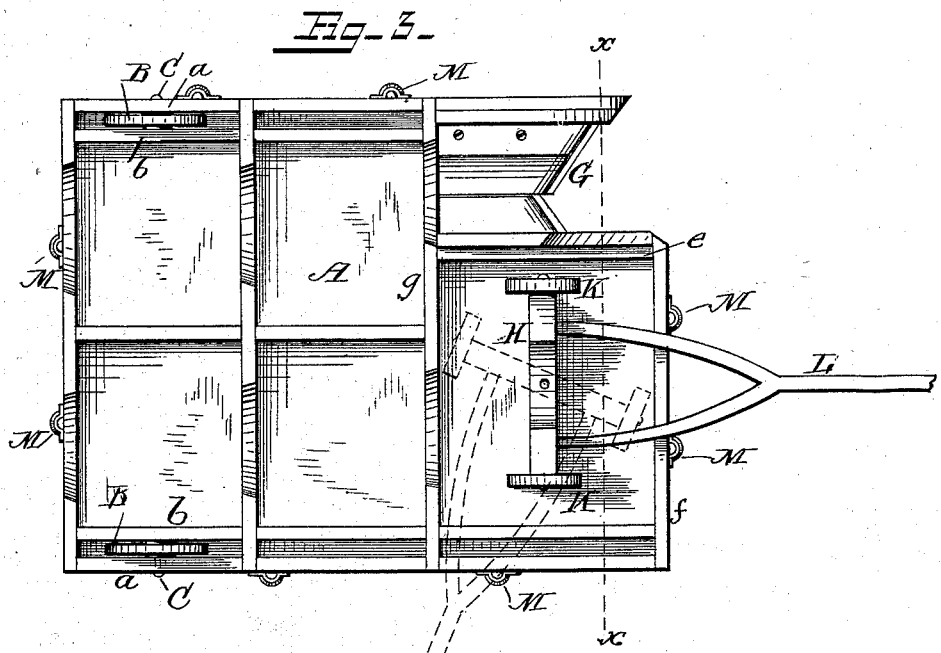
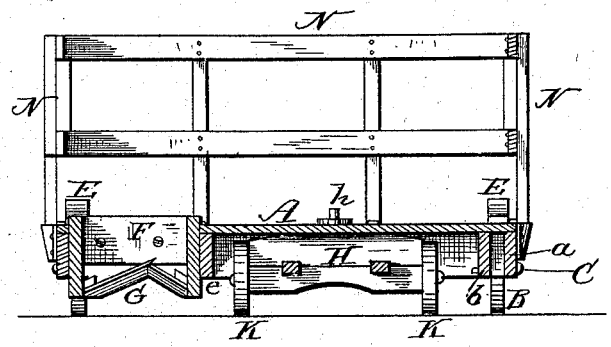
WITNESSES
Franck L. Ourand,
Tr. E. Oliphant
INVENTOR
Andrew W. Taylor,
per Chas. H. Fowler
Attorney

UNITED STATES PATENT OFFICE.

ANDREW W. TAYLOR, OF SALISBURY, MISSOURI, ASSIGNOR OF ONE-HALF TO REUBEN WINFREE, OF SAME PLACE.

CORN-HARVESTER.

SPECIFICATION forming part of Letters Patent No. 274,843, dated March 27, 1883.

Application filed July 20, 1882. (No model.)

*To all whom it may concern:*

Be it known that I, ANDREW W. TAYLOR, a citizen of the United States, residing at Salisbury, in the county of Chariton and State of Missouri, have invented certain new and usefull Improvements in Corn-Harvesters; and I do hereby declare that the following is a full, clear, and exact description of the same, reference being had to the annexed drawings, making a part of this specification, and to the letters and figures of reference marked thereon.

Figure 1:
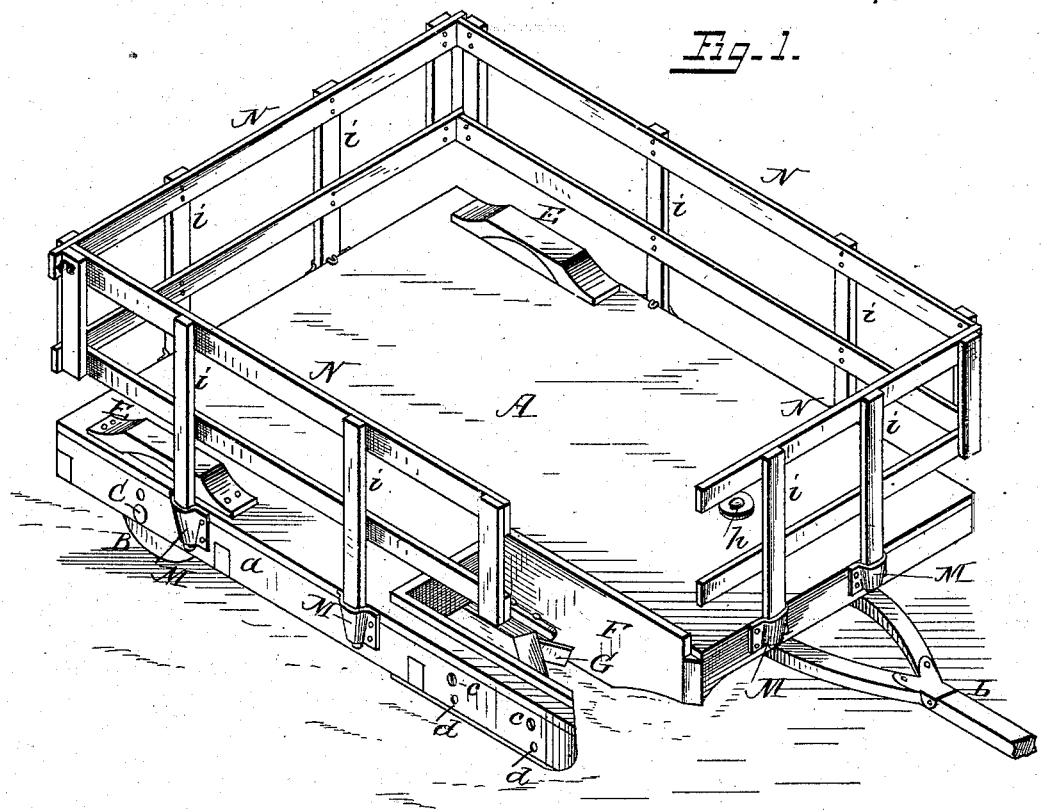
Figure 2:
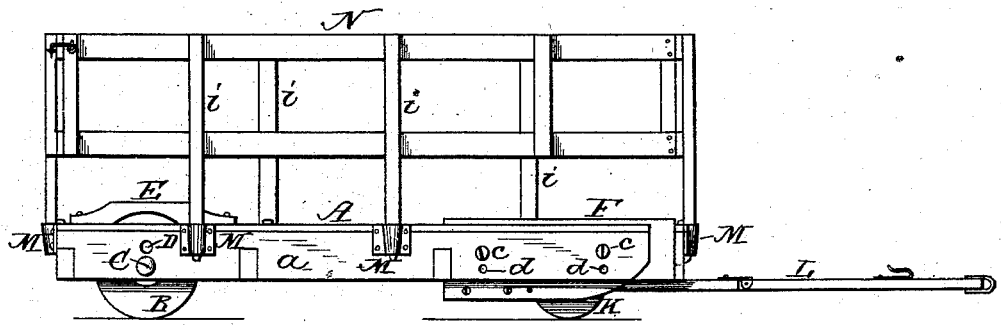

Figure 1 of the drawings is a perspective view of my invention; Fig. 2, a side elevation; Fig. 3, a bottom plan view; and Fig. 4, a cross section of the same, taken through line $x\ x$, Fig. 3.

The present invention has relation to certain new and useful improvements in that class of corn-harvesters provided with a platform for receiving the corn or cane when cut, also means for regulating the height of the platform by adjustable axles, and also means for adjusting the knives.

The object of the present invention is to improve the above class of corn-harvesters; and it consists in the details of construction hereinafter described and claimed.

In the accompanying drawings, A represents the platform of a corn-harvester, mounted upon a suitable frame, so constructed as to do away with the ordinary axle extending entirely across the under side of the frame for the rear wheels to revolve upon. Instead of this ordinary axle, the rear wheels, B, of the machine are journaled upon short axles C, between the outer side frames, $a$, and corresponding inner side frames, $b$, and are capable of ready adjustment, to raise or lower the platform to suit the height of the corn or cane to be cut, by means of a series of axle-bearings, D, arranged in a vertical line in the outer and inner side frames, $a\ b$. Thus, when the platform is desired to be raised or lowered, the short axles C are removed from their present bearings and placed in like bearings either above or below, as may be desired by the operator. Especially is this feature of the invention a desirable one where corn or cane is grown upon a stony field, or where inequalities of the surface are liable to strike the under side of the platform and damage the machine. The wheels B are covered and protected by suitable caps, E, which prevent the stalks or blades from being drawn down and choking or impeding the revolution of the said wheels.

To the front of the platform A, at one side, is set in an adjustable box, F, carrying cutting-knives G, said box being readily adjusted in a vertical direction, to suit the height of corn or cane to be cut or the inequalities of the ground-surface, by means of pins $c$, fitting into holes $d$, arranged in a vertical direction in the outer side frame, $a$, at one side, and into a short longitudinal bar, $e$, at the other side of the said box F, beneath the platform A, this said longitudinal bar $e$ being placed between the end bar, $f$, and a crossbar, $g$, of the frame. At its front end and swiveled beneath the platform A by means of a king-bolt, $h$, is an axle, H, carrying wheels K and tongue L.

To the front and outside bars of the machine are affixed sockets M, into which fit the lower ends of upright standards $i$ of frames N, which hold the cut corn or cane upon the platform A until a sufficient amount has been cut to make a load or shock, said frames being coupled together at their ends by hooks and staples, or other suitable means, so that either side or end frame may be readily detached and removed to unload the corn or cane at the convenience of the operator.

Having now fully described my invention, what I claim as new, and desire to secure by Letters Patent, is—

In a corn-harvester, the platform A, provided with removable frames N, connected to its four sides, the adjustable axles C, and adjustable box F, carrying knives G, and the swivel axle H, connected to the under side of the platform, and constructed to operate substantially as and for the purpose set forth.

In testimony that I claim the above I have hereunto subscribed my name in the presence of two witnesses.

ANDREW W. TAYLOR.

Witnesses:
J. W. TAYLOR,
P. F. FLEMING.